(12) United States Patent
Nakaya et al.

(10) Patent No.: US 6,176,130 B1
(45) Date of Patent: Jan. 23, 2001

(54) FLIGHT VELOCITY VECTOR MEASURING SYSTEM IN WIDE VELOCITY REGION USING TRUNCATED PYRAMID-SHAPE PROBE

(75) Inventors: Teruomi Nakaya, Machida; Naoaki Kuwano, Chofu; Seigou Nakamura, Mitaka; Asao Hanzawa, Hachioji, all of (JP)

(73) Assignee: National Aerospace Laboratory of Science & Technology Agency, Chofu (JP)

( * ) Notice: Under 35 U.S.C. 154(b), the term of this patent shall be extended for 0 days.

(21) Appl. No.: 09/004,272

(22) Filed: Jan. 8, 1998

(30) Foreign Application Priority Data

Jun. 3, 1997 (JP) .................................................. 9-159300

(51) Int. Cl.[7] .................................................. G01C 21/00
(52) U.S. Cl. .............................................................. 73/182
(58) Field of Search ........................ 73/182, 147, 182.66

(56) References Cited

U.S. PATENT DOCUMENTS 5,423,209 * 6/1995 Nakaya et al. ........................ 73/182
5,756,891 * 5/1998 Nakaya et al. ........................ 73/147
5,866,813 * 2/1999 Nakaya et al. ........................ 73/147

* cited by examiner

Primary Examiner—Benjamin R. Fuller
Assistant Examiner—Jewel V. Thompson
(74) Attorney, Agent, or Firm—Armstrong, Westerman, Hattori, McLeland & Naughton

(57) ABSTRACT

A flight velocity vector measuring system in a wide velocity region in which an attack angle pressure coefficient $C\alpha$ of air current, a sideslip angle pressure coefficient $C\beta$ and an air current angle pressure coefficient $C\gamma$ are obtained from five pressure information detected by a square truncated pyramid-shape probe. The aforementioned pressure coefficients, pressure calibration coefficients with respect to a Mach number M, an attack angle $\alpha$ and a sideslip angle $\beta$ every velocity region obtained by dividing the wide velocity region into a plurality of regions stored in advance in the calculation processor, and a Mach number M, an attack angle $\alpha$ and a sideslip angle $\beta$ of unknown quantity constitute a calculation processing expression comprising a polynomial approximation to call the pressure calibration coefficients in the velocity region, and flight velocity vectors (M, $\alpha$, $\beta$) are calculated by the polynomial approximation.

7 Claims, 15 Drawing Sheets

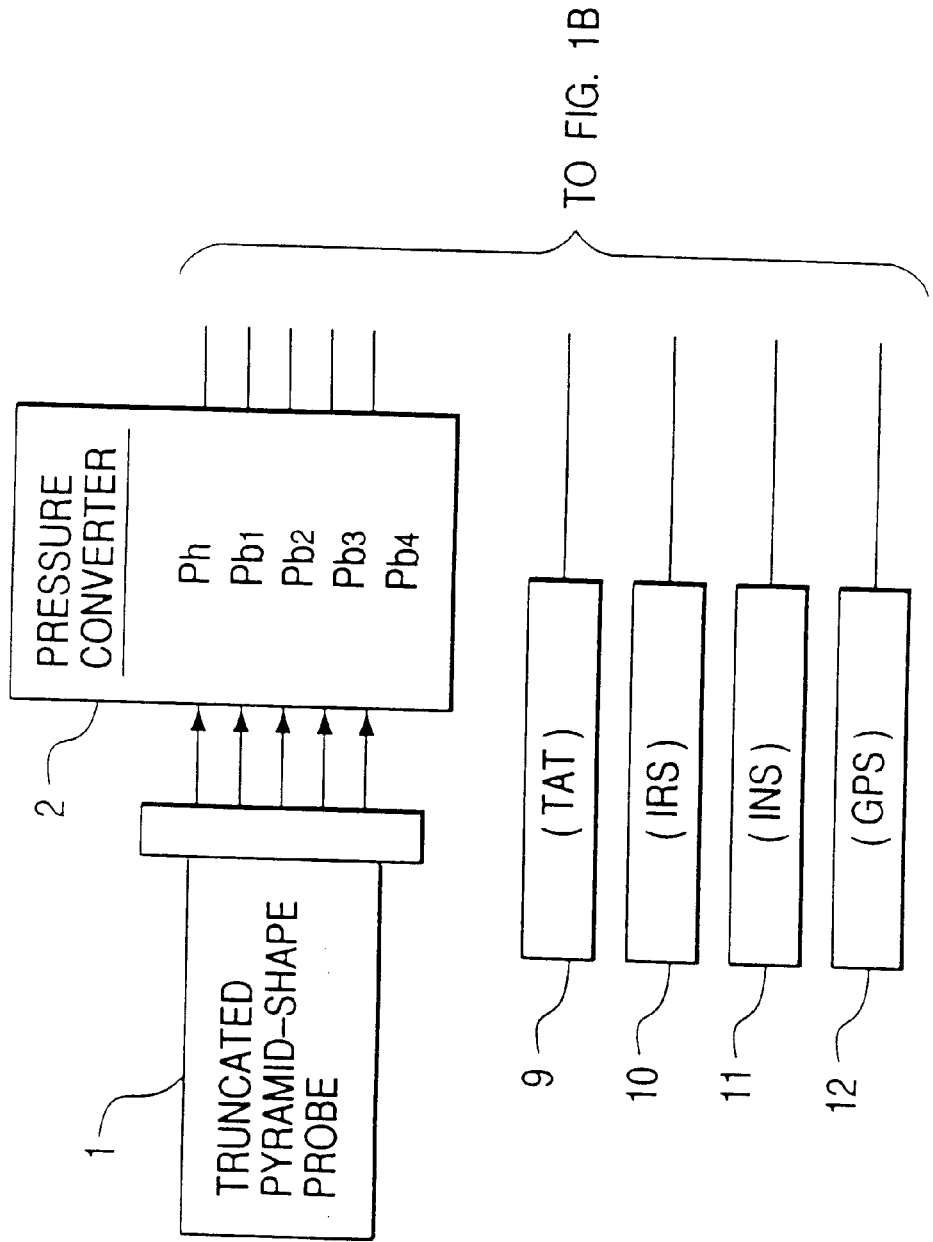

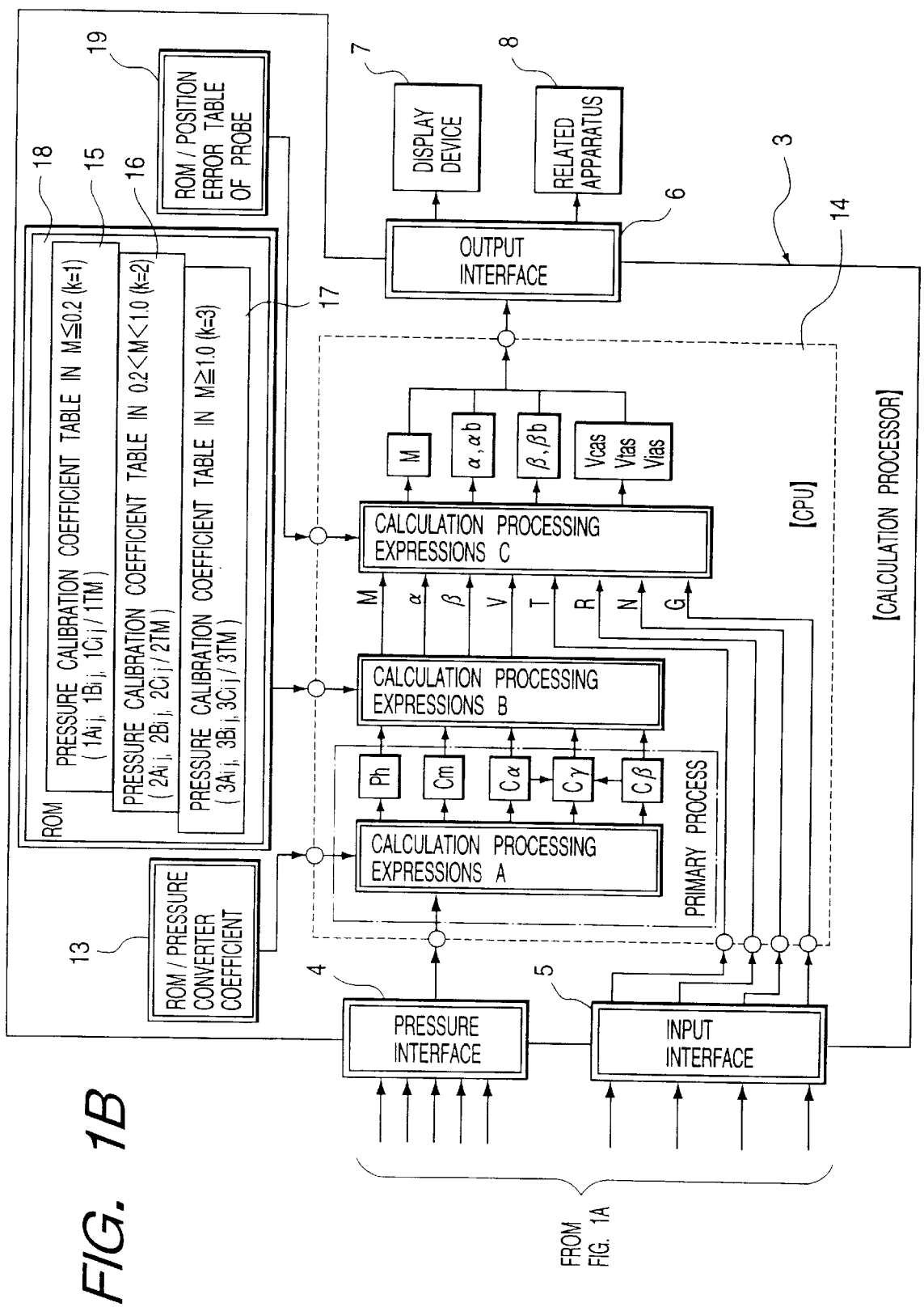

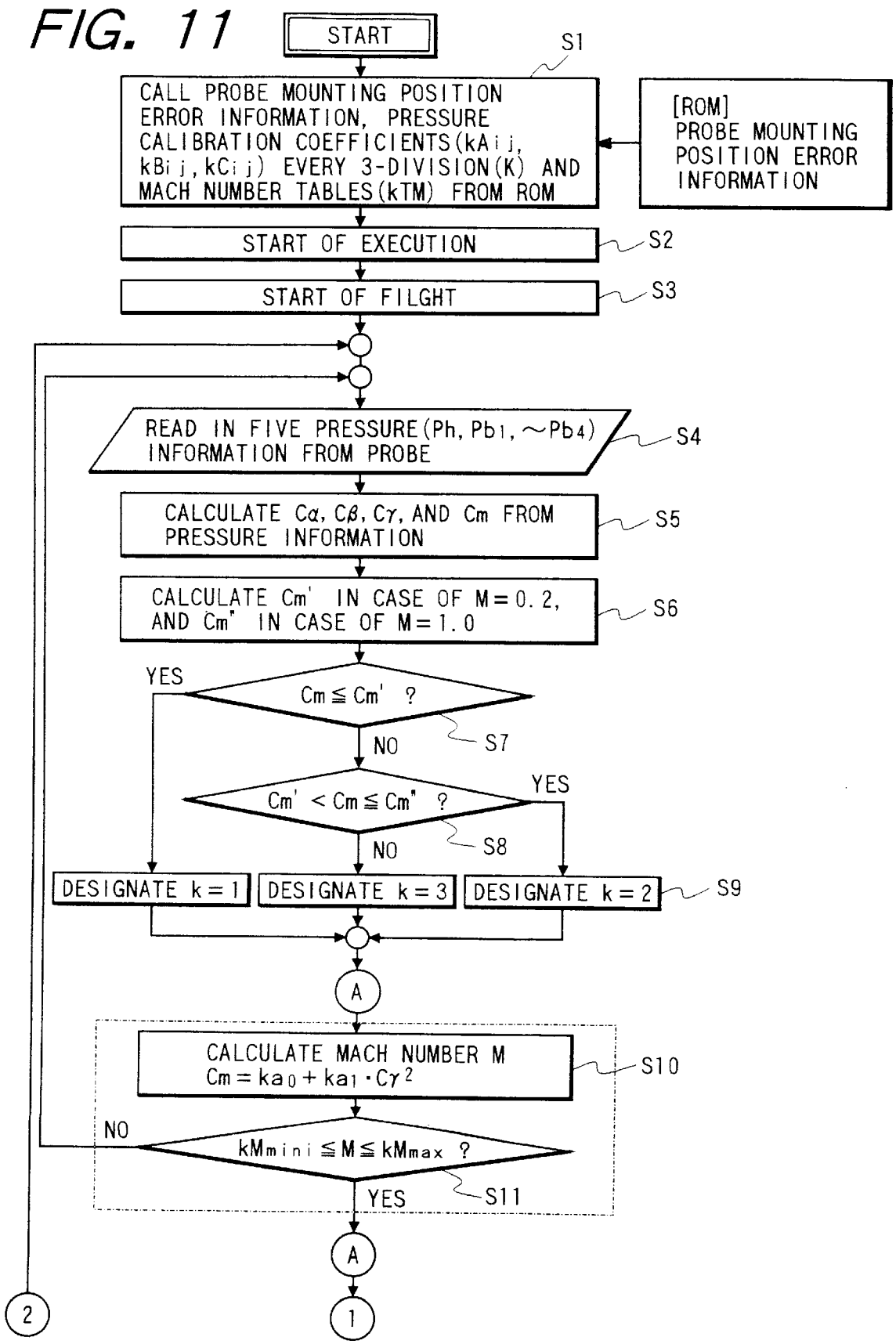

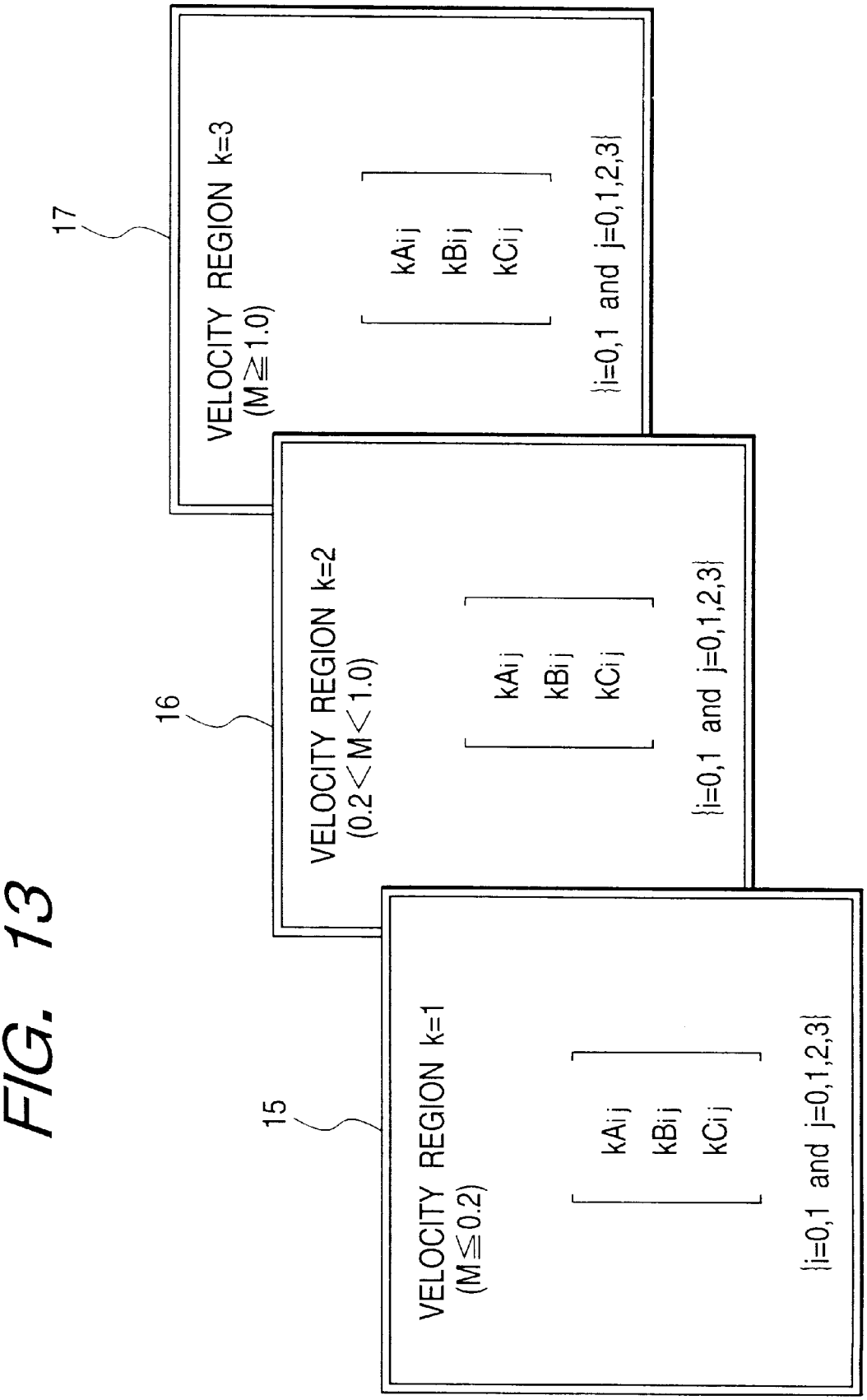

US 6,176,130 B1

FLIGHT VELOCITY VECTOR MEASURING SYSTEM IN WIDE VELOCITY REGION USING TRUNCATED PYRAMID-SHAPE PROBE

BACKGROUND OF THE INVENTION (1) Field of the Invention

The present invention relates to a flight velocity vector measuring system in a wide velocity region using a truncated-shape probe, and more particularly to a flight velocity measuring system in a wide velocity region using a square truncated pyramid-shape probe capable of measuring a flight velocity vector by a calculation process on the basis of air data obtained by the square truncated pyramid-shape probe in a wide velocity region from a low velocity to a supersonic velocity.

(2) Description of the Related Art

A flight velocity vector measuring system for measuring a flight velocity vector using a square truncated pyramid-shape probe so far known has been proposed by the present inventors (see U.S. Pat. No. 5,423,209 specification). In the conventional flight velocity vector measuring system using a square truncated pyramid-shape probe, the probe is mainly directed at the low speed region which is not affected by compressibility and shock wave. The calculation of the flight velocity vector is done on the basis of dynamic pressure. The flight velocity vector is computed by substituting five pressure information (that is, a total pressure and four pressures on a truncated pyramid-shape surface) obtained from the square truncated pyramid-shape probe and pressure calibration coefficients obtained in advance into a polynomial approximation and using a Newton-Raphson method (a repetition computing method). Further, the pressure calibration coefficients are calculated on the basis of the dynamic pressure in the flight change and five pressure information every change of probe angle.

In general, for definition of velocity representative of the magnitude of velocity in a region from low velocity to supersonic velocity, Mach number is applied taking a concept of sonic velocity into consideration. Since the air current is changed into an incompressible flow, a compressible flow and a flow caused by a shock wave according to the velocity region, the Mach number is obtained by separate operational expressions corresponding to these flows. That is, in the low velocity flight, the velocity is simply obtained from the dynamic pressure obtained by a difference between total pressure and static pressure without taking the compressibility into consideration. Further, since the compressibility influences on the probe as the velocity comes close to the sonic velocity, the velocity should be obtained by an expression which takes the compressibility into consideration. Furthermore, in the case of the flight beyond the sonic velocity, the shock wave is generated in front of the probe so that the pressure information detected before and behind the shock wave. Therefore, the velocity is obtained by using an operational expressing which takes these into consideration. In the case of flight at a large attitude angle in velocity regions, it is important to take an influence of all pressure differentials caused by a movement of a stagnation point of the probe into consideration.

From the above-described fact, in the case of flight at a high attitude angle in a wide velocity region, in the flight velocity vector calculation process according to a set of pressure calibration coefficients, it is difficult to enhance the measuring accuracy. Further, when the probe calibration coefficient every velocity is used in order to secure the accuracy, the process time increases, making it difficult to put to practical use.

SUMMARY OF THE INVENTION

An object of the present invention is to provide, by further improving the conventional flight velocity vector calculation processing system using the truncated pyramid-shape probe, a flight velocity vector calculation processing system capable of obtaining a flight velocity vector with high accuracy and high velocity even in the case of flight at a large attitude angle in a wide velocity region from a low velocity to a supersonic velocity.

The flight velocity vector measuring system in a wide velocity region according to the present invention includes a primary calculation processing and a secondary calculation processing. In the primary calculation processing, five pressure information items detected by the square truncated pyramid-shape probe an extreme end of which has a truncated pyramid-shape and which has a total pressure hole at the apex, said probe being provided with pressure holes in each truncated pyramid-shape surface, are converted into electrical signals and incorporated into a calculation processor. An attack angle pressure coefficient $C\alpha$ of an air current is obtained from pressure differential information of upper and lower pressure holes of the probe and a sideslip angle pressure coefficient $C\beta$ is obtained from pressure differential information of left and right pressure holes, and an air current angle pressure coefficient $C\gamma$ is obtained from the obtained attack angle pressure coefficient $C\alpha$ and sideslip angle pressure coefficient $C\beta$.

In the secondary calculation processing, the attack angle pressure coefficient $C\alpha$, the sideslip angle pressure coefficient $C\beta$ and the air current angle pressure coefficient $C\gamma$, pressure calibration coefficients with respect to the Mach number M, the attack angle $\alpha$ and the sideslip angle $\beta$ of the probe every velocity region obtained by dividing the wide velocity region pre-stored in the calculation processor into a plurality of regions, and the unknown-quantity Mach number M, the attack angle $\alpha$ and the sideslip angle $\beta$ constitute an operational expression comprising a polynomial approximation to determine the magnitude of Mach number. The velocity region is then determined by the obtained Mach number, the pressure calibration coefficients in the velocity region are called, and the flight vector (M, $\alpha$, $\beta$) is calculated by the polynomial approximation.

The calculation processes include a successive computation method which executes in accordance with the calculation process determined every updating, and a table conversion system, which computes Mach number from an air current angle pressure coefficient $C\gamma$ and a Mach pressure coefficient Cm obtained in advance, omitting an intermediate solution by way of a tertiary equation for calculating Mach number, to prepare a Mach number table TM whereby the Mach number is directly read. In the latter method, the air current angle pressure coefficient $C\gamma$ and the Mach pressure coefficient Cm are first simultaneously obtained from five pressure information, and the flight pressure coefficient to determine a divisional region k. After velocity region when updating is grasped from the value of the Mach determination of the velocity region, the Mach number is obtained on the basis of the air current angle pressure coefficient $C\gamma$ and the Mach pressure coefficient Cm from the Mach number table TM in the region.

BRIEF DESCRIPTION OF THE DRAWINGS

FIGS. 1A and 1B are a block diagram showing a schematic constitution of a flight velocity vector measuring system in a wide velocity region according to an embodiment of the present invention;

FIG. 11 shows a part of a flowchart of a calculation process of the flight velocity vector measuring system in a wide velocity region according to an embodiment of the present invention;

FIG. 13 is a schematic view of each pressure calibration coefficient table in three velocity regions;

Figure 2:
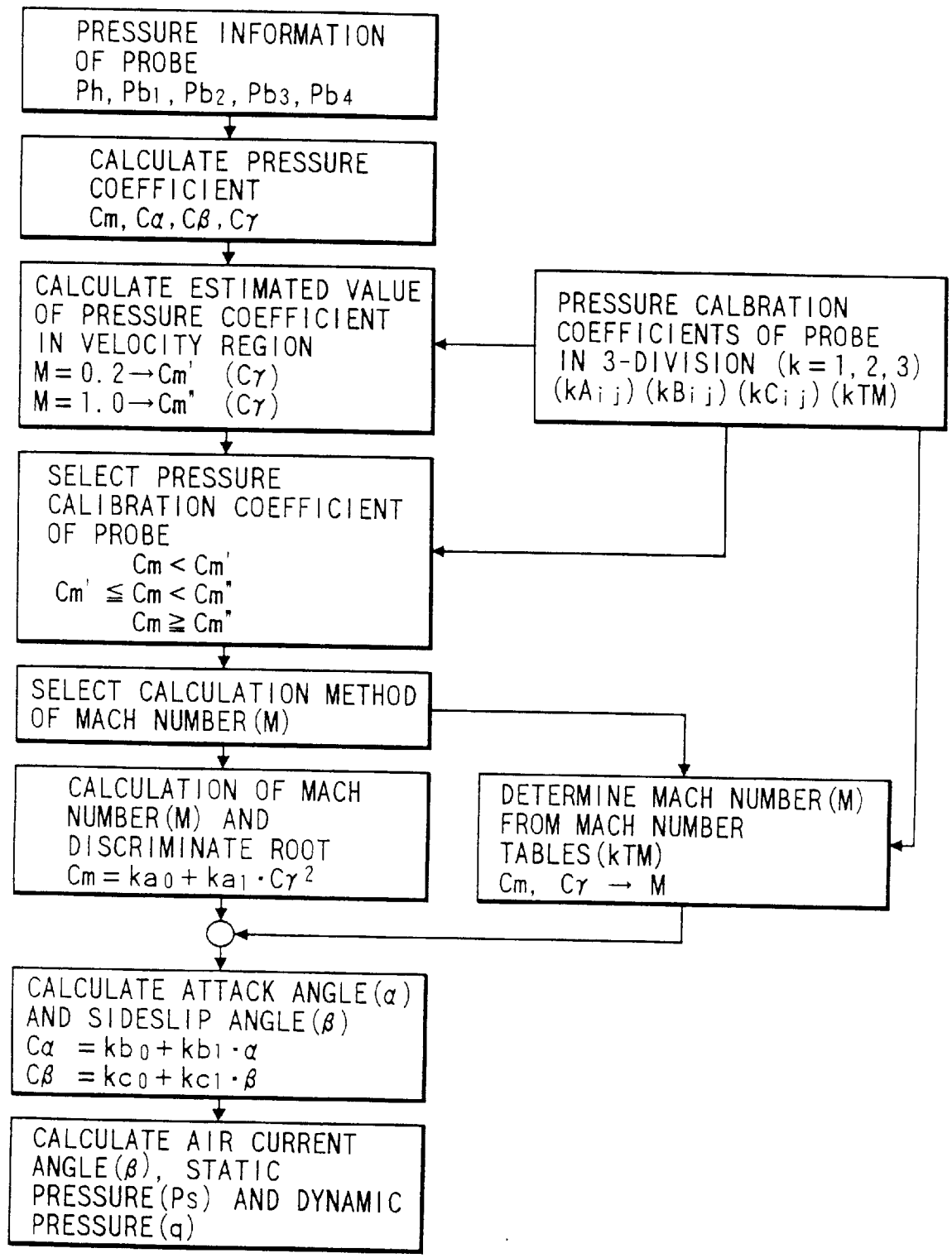
FIG. 2 is a block diagram showing a main constitution of a secondary process thereof.
Figure 3:
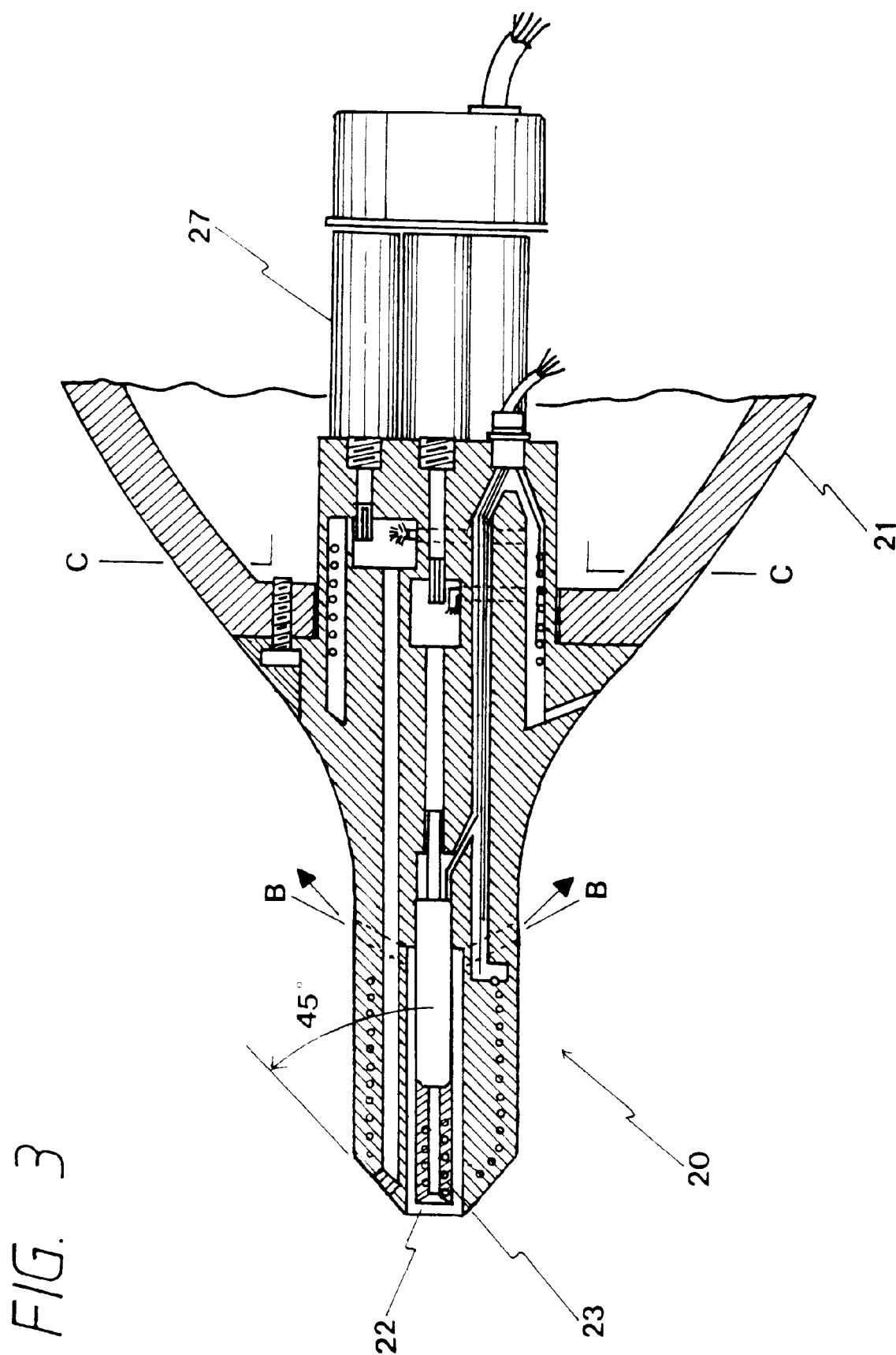
FIG. 3 is a sectional view of a square truncated pyramid-shape probe used in the wide velocity region according to the present invention.
Figure 4A:
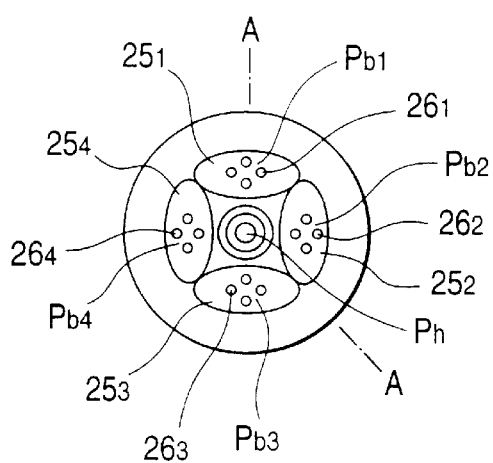
FIG. 4 (a) is a left side view of the square truncated pyramid-shape probe in FIG. 3, FIG. 4 (b) is a sectional view taken on B—B, and FIG. 4 (c) is a sectional view taken on C—C.
Figure 4B:
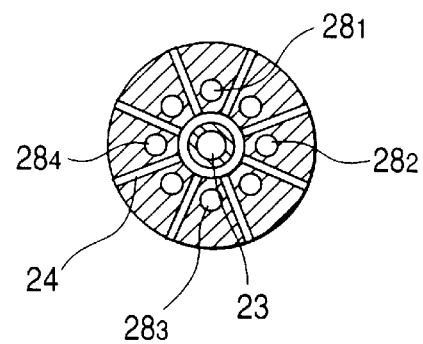
Figure 4C:
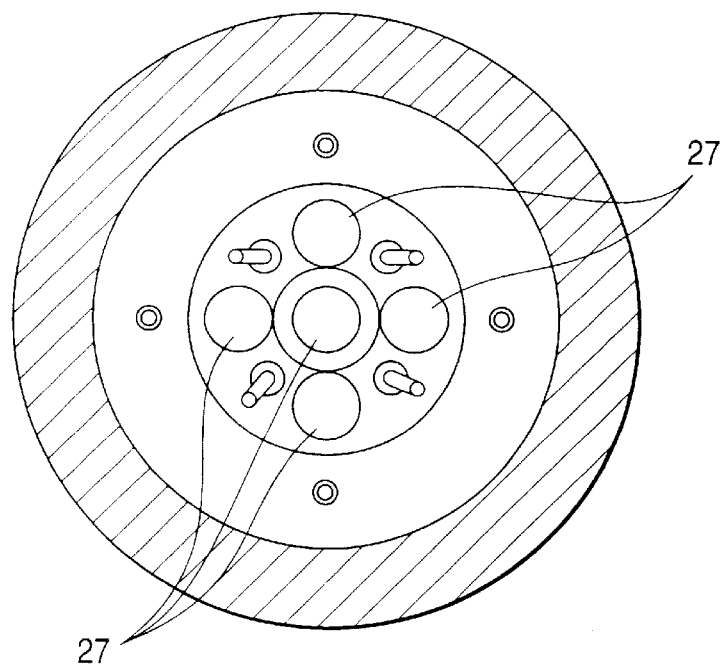
Figure 7:
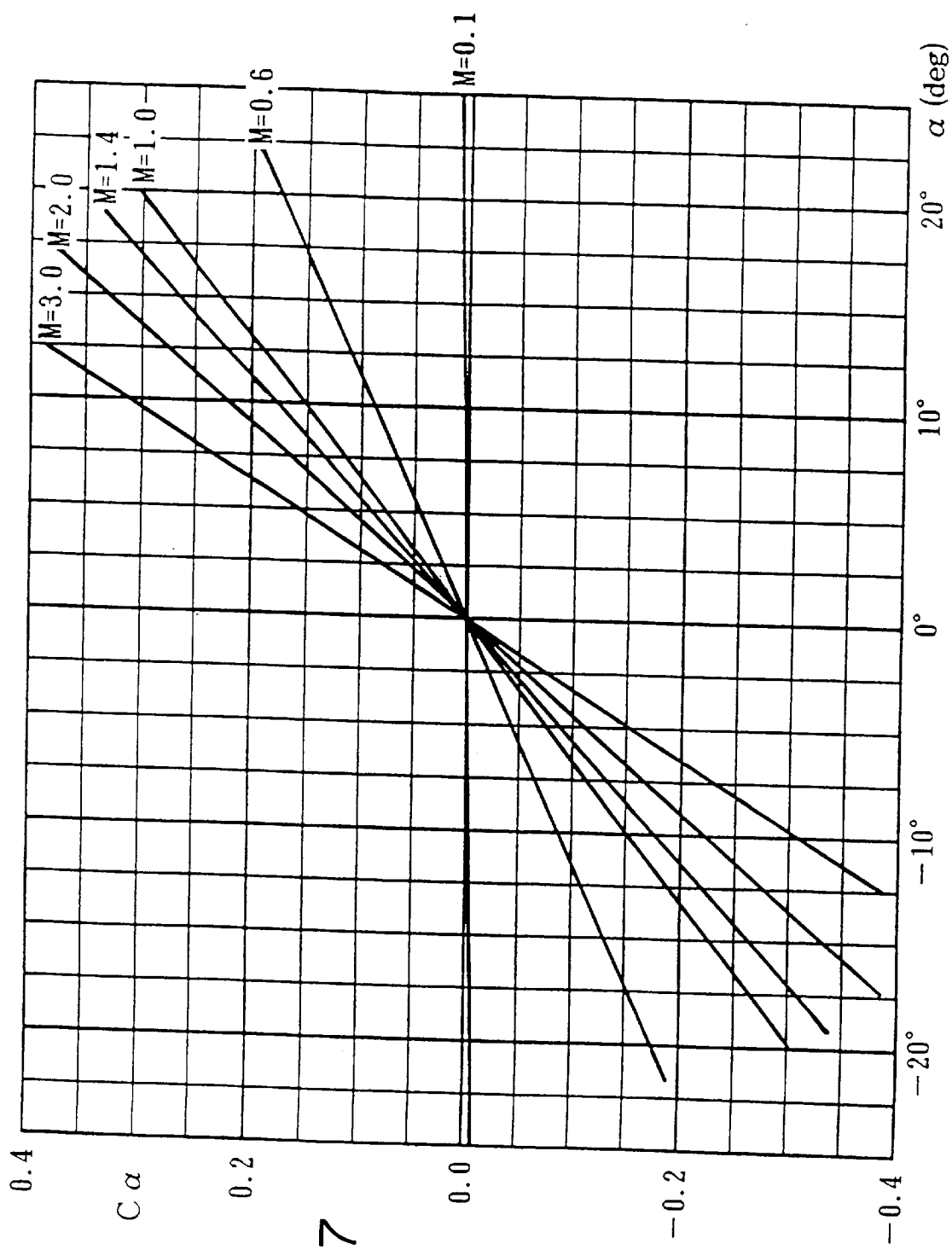
FIG. 7 is a graph showing a relationship of an air current pressure coefficient every Mach number with respect to a set attack angle of the square truncated pyramid-shape probe in a wind tunnel test.
Figure 8:
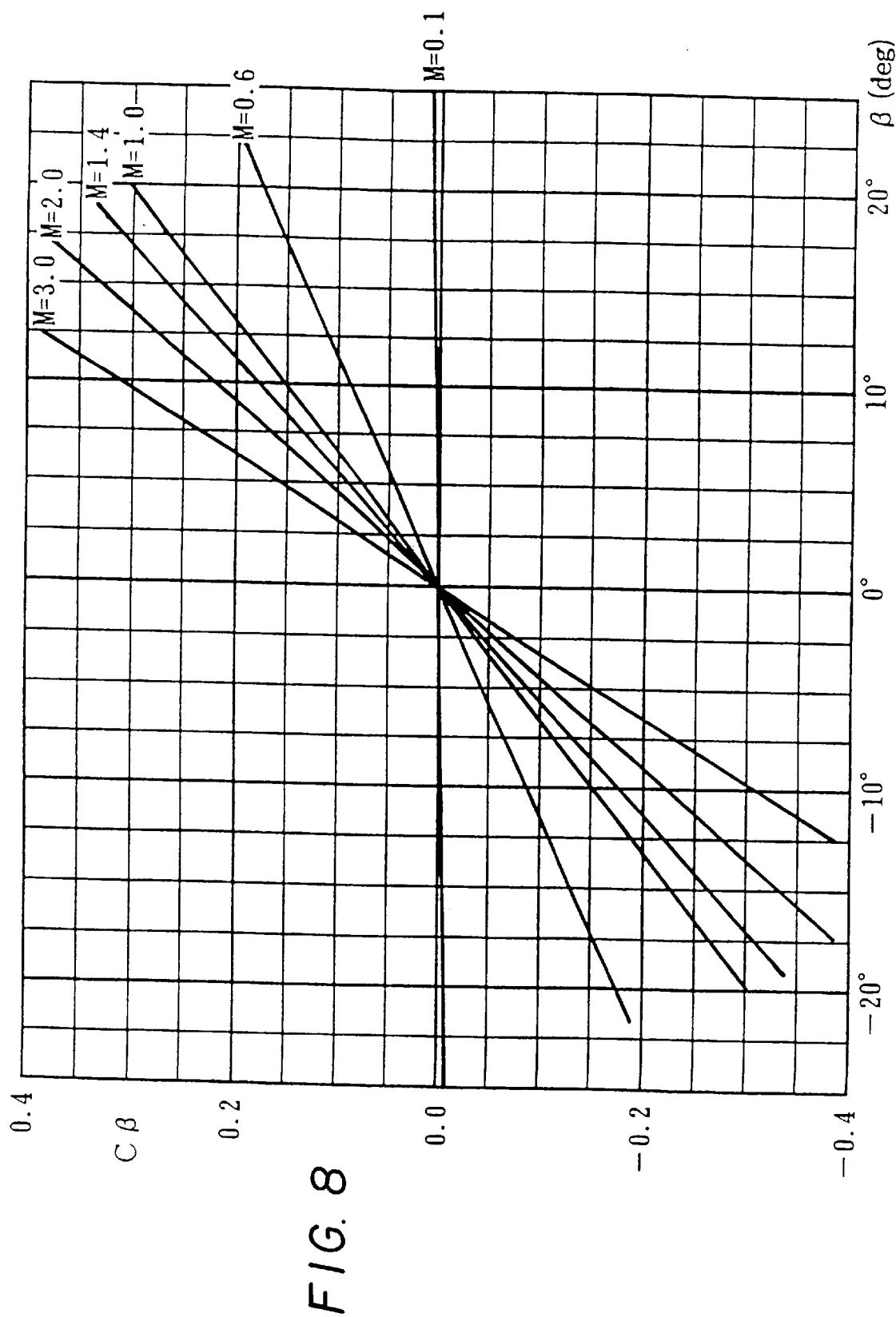
FIG. 8 is a graph showing a relationship of a sideslip pressure angle coefficient every Mach number with respect to a set sideslip angle of the square truncated pyramid-shape probe in a wind tunnel test.

DESCRIPTION OF THE PREFERRED EMBODIMENTS (1) Analytical Background of the Invention The present inventors have performed a wind tunnel test in the process of study for achieving the aforementioned object. A square truncated pyramid-shape probe (hereinafter merely referred to as a probe) as shown in FIGS. 3 to 4 is installed in a wind tunnel from a low velocity to a supersonic velocity. In various Mach numbers, an attack angle α and a sideslip angle β are varied to measure a variation of an attack angle pressure coefficient Cα with respect to a variation of an attack angle α, and a variation of a sideslip pressure coefficient Cβ with respect to a variation of a sideslip angle β from five pressure information detected by the probe. Results of measurement are shown in FIGS. 7 and 8.

It has been confirmed from the above results that in the wide velocity region from a low velocity to a supersonic velocity, the attack angle pressure coefficient Cα is proportional to the variation of the set attack angle α, and the larger the set attack angle, the larger the attack angle pressure coefficient. Further, the larger the Mach number, the large the attack angle pressure coefficient with respect to the set attack angle. Also, with respect to the sideslip pressure coefficient Cβ with respect to the sideslip angle β, a similar result was obtained as shown in FIG. 8.

Figure 9:
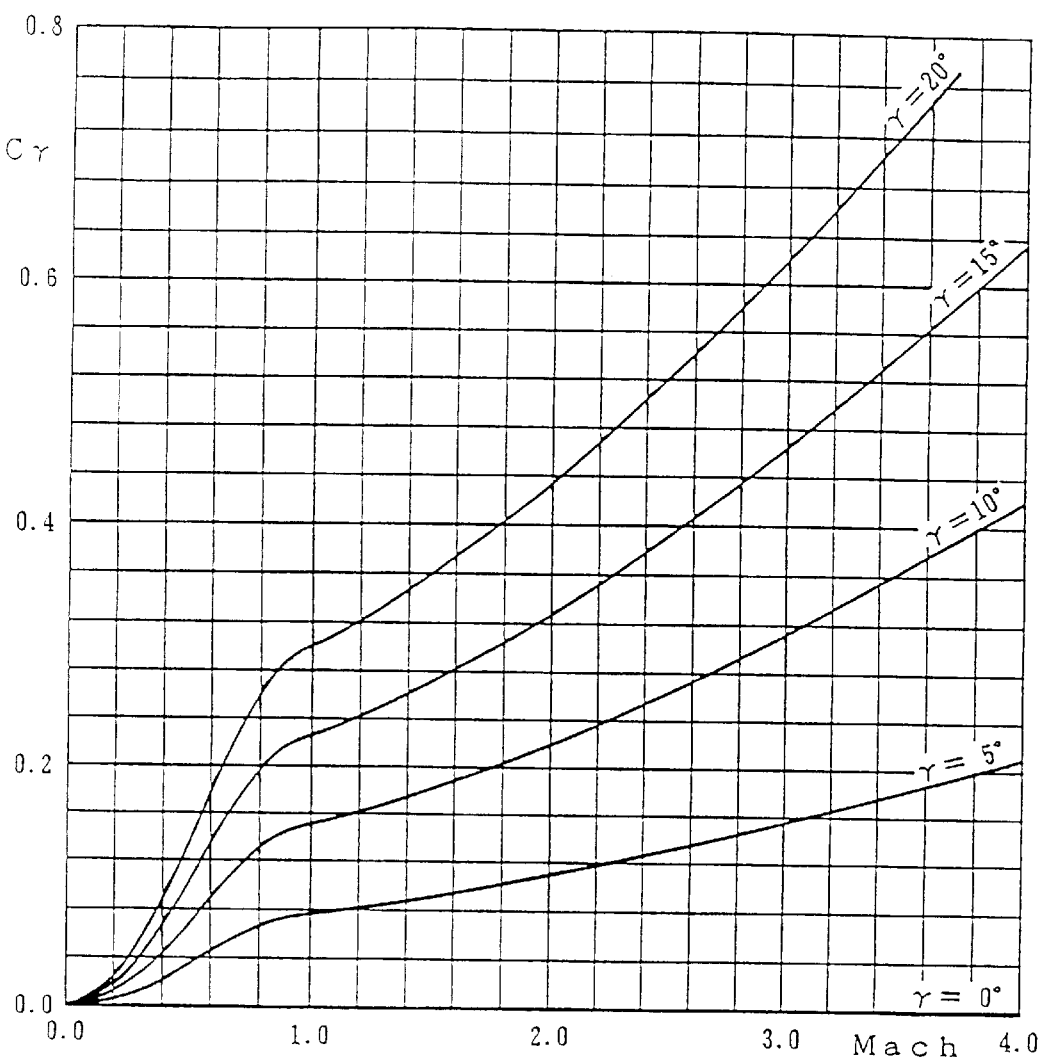
FIG. 9 is a graph showing a relationship of a air current angle pressure coefficient every air current angle with respect to a set Mach number of the square truncated pyramid-shape probe in a wind tunnel test.
Figure 10:
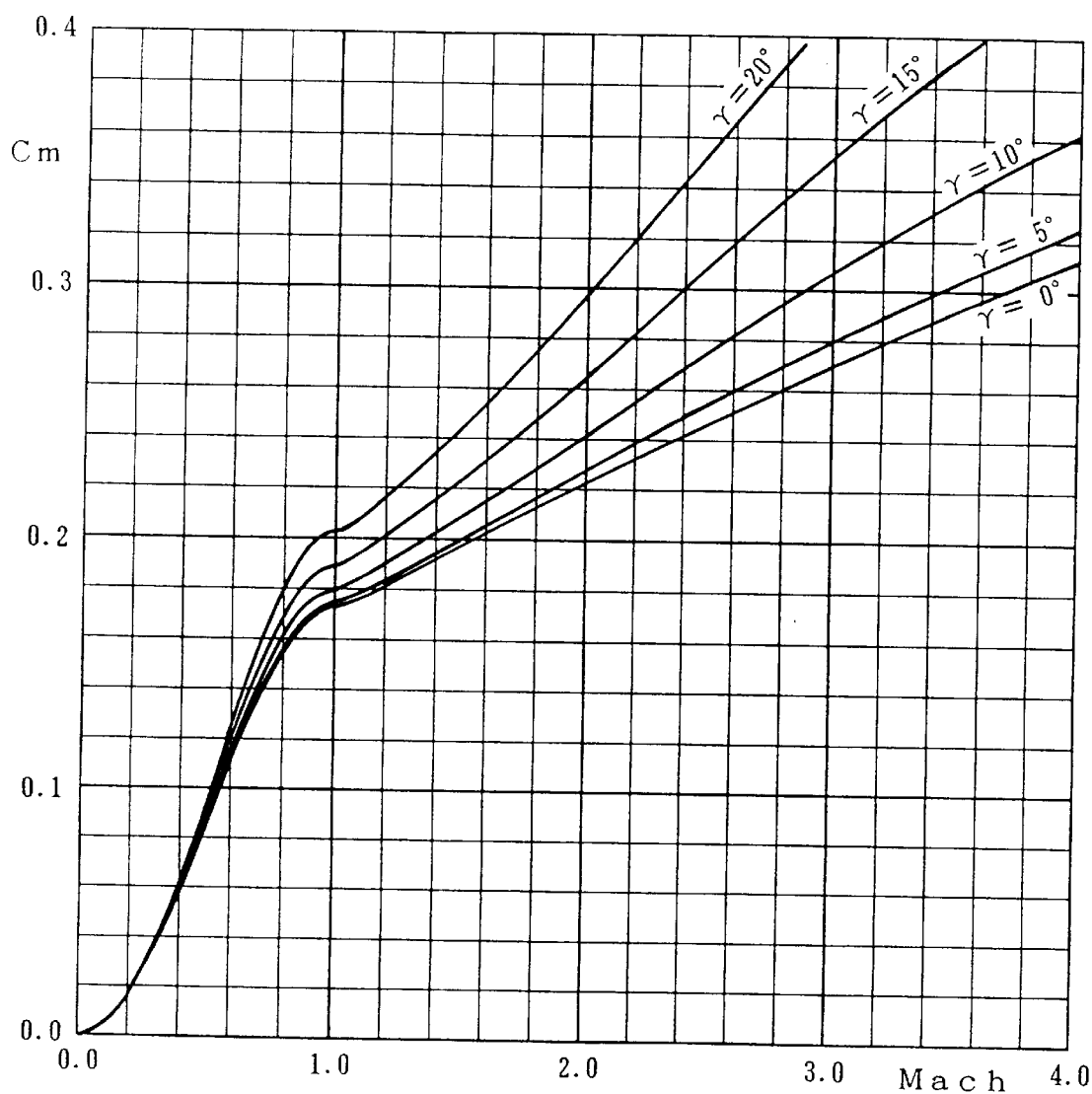
FIG. 10 is a graph showing a relationship of a Mach pressure coefficient every air current angle with respect to a set Mach number of the square truncated pyramid-shape probe in a wind tunnel test.
Figure 12A:
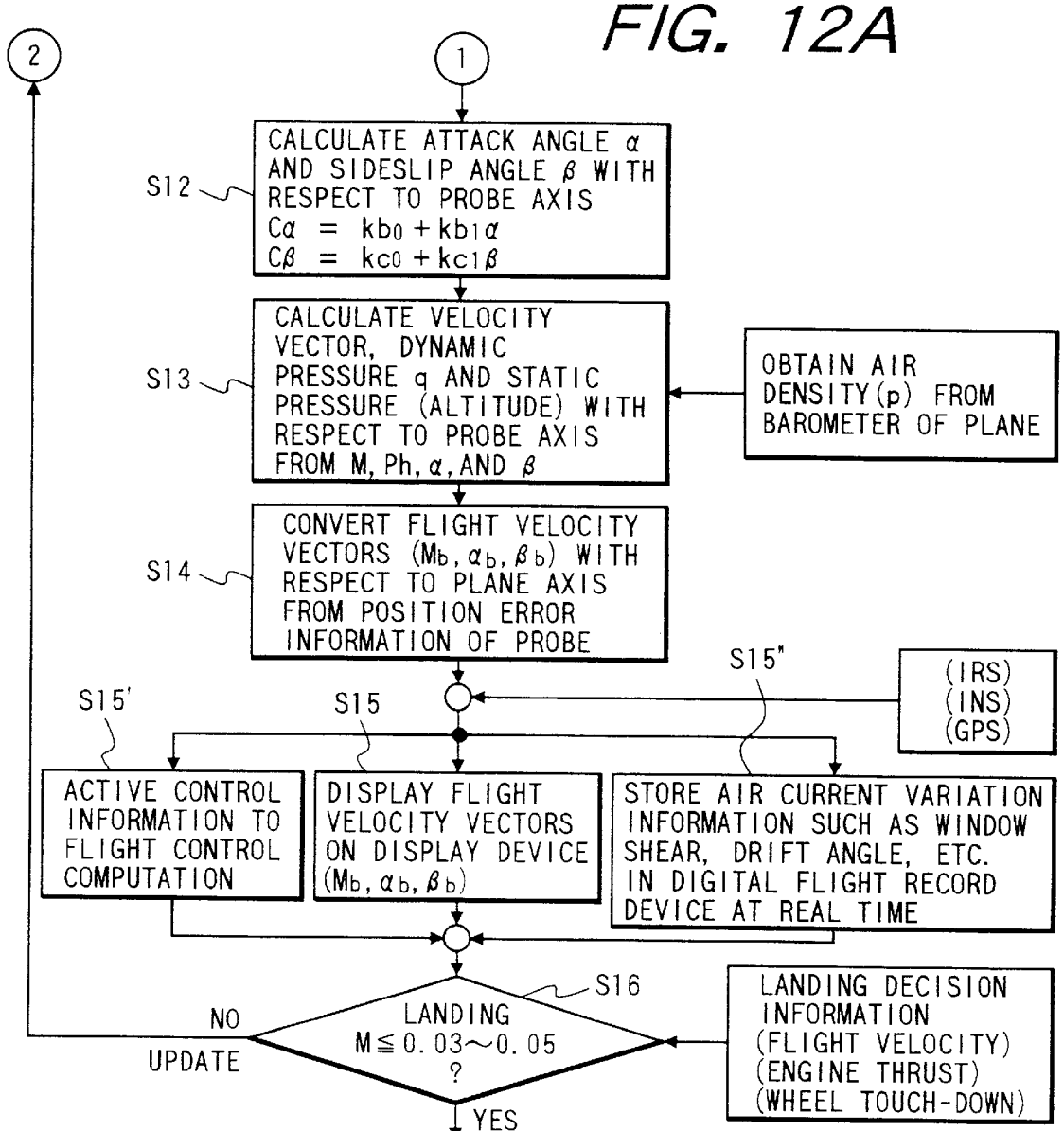
FIG. 12 (a) shows a part of a flowchart continuous to the flowchart shown in FIG. 11, and FIG. 12 (b) shows a substitution step of S10 and S11 of the flowchart shown in FIG. 11.
Figure 12B:
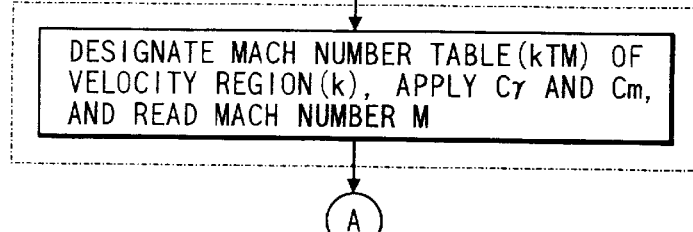

Moreover, with respect to various probe angles γ relative to the air current axis, the Mach number was varied in the state in which the probe angle is fixed to a suitable angle to measure a variation of an air current angle pressure coefficient with respect to Mach number and a variation of a Mach pressure coefficient were measured from five pressure information. Results of measurement are shown in FIGS. 9 and 10.

It has been confirmed from these test results that out of five pressure information (total pressure Ph, side pressures $Pb_1$, $Pb_2$, $Pb_3$, and $Pb_4$ on each truncated pyramid-shape surface) detected by the square truncated pyramid-shape probe, the total pressure is large in dead zone characteristics with respect to the air current angle to enable the detection of a fixed total pressure to a large air current angle, and that a pressure differential is linear with respect to a variation of Mach number. It has been also found that in the case of flight of the wide velocity region in an attitude of high angle, the air current angle pressure coefficient Cγ and the Mach pressure coefficient Cm are non-linear in the wide velocity region, as shown in FIGS. 9 and 10, but in case of three regions, i.e., an incompressible flow ($M \leq 0.2$), a compressible flow ($0.2 < M < 1.0$) and a flow caused by a shock wave (($M \leq 1.0$) divided, a variation with a substantially similar trend results in the respective regions.

The present invention has been achieved from a knowledge obtained from a result of further study paying attention to the test results of a wind tunnel described above that a non-linear variation of the air current angle pressure coefficient Cγ (a function of the attack angle pressure coefficient Cα and the sideslip angle pressure coefficient Cβ) with respect to a variation of Mach number, and the Mach pressure coefficient Cm is represented by approximation every region which varies with a substantially similar trend to divide it every region whereby the total pressure is replaced by the dynamic pressure, and the flight velocity vector can be obtained with high accuracy and at real time by the calculation process with a variation of Mach number being a reference.

The principle of the flight velocity vector system in a wide velocity region according to the present invention will be further explained hereinafter.

First, the Mach pressure coefficient Cm, the attack angle pressure coefficient Cα, and the sideslip angle pressure coefficient Cβ are obtained by a group of primary calculation processing expressions shown in expressions (1) to (4) below from five pressure information obtained from the probe during the flight.

$$Cm = (Ph - P)/Ph \quad (1)$$

(wherein, $P = (Pb_1 + Pb_2 + Pb_3 + Pb_4)/4$)

$$C\alpha = (Pb_3 - Pb_1)/Ph \quad (2)$$

$$C\beta = (Pb_4 - Pb_2)/Ph \quad (3)$$

$$C\gamma = \sqrt{(C\alpha^2 + C\beta^2)} \quad (4)$$

In the aforementioned three velocity regions from low velocity to supersonic velocity (In the following symbols and expressions, k is used as a suffix indicative of the velocity region. k=1 is $0.2 \geqq M$, k=2 is $0.2 < M \leqq 1.0$, and k=3 is $1.0 < M$), a Mach pressure calibration coefficient kAij (i=0, 1, j=0 to 3. The same is true for the following.), an attack angle pressure calibration coefficient kBij, and a sideslip angle pressure calibration coefficient kCij are obtained in advance by the wind tunnel test every probe type, and a relationship between these pressure coefficients and the Mach pressure coefficient Cm, the attack angle pressure coefficient C$\alpha$, the sideslip angle pressure coefficient C$\beta$ and the air current angle pressure coefficient C$\gamma$ is expressed by polynomial approximations comprising a group of secondary calculation processing expressions shown in Expressions (5) to (7) as functions of the Mach number M, the attack angle $\alpha$ and sideslip angle $\beta$.

$$Cm = ka_0 + ka_1 \cdot C\gamma^2 = (kA_{00} + kA_{10} \cdot C\gamma^2) + (kA_{01} + kA_{11} \cdot C\gamma^2) M + (kA_{02} + kA_{12} \cdot C\gamma^2) M^2 + (kA_{03} + kA_{13} \cdot C\gamma^2) M^3 \quad (5)$$

$$C\alpha = kb_0 + kb_1 \cdot \alpha = (kB_{00} + kB_{10} \cdot \alpha) + (kB_{01} + kB_{11} \cdot \alpha) M + (kB_{02} + kB_{12} \cdot \alpha) M^2 + (kB_{03} + kB_{13} \cdot \alpha) M^3 \quad (6)$$

$$C\beta = kc_0 + kc_1 \cdot \beta = (kC_{00} + kC_{10} \cdot \beta) + (kC_{01} + kC_{11} \cdot \beta) M + (kC_{02} + kC_{12} \cdot \beta) M^2 + (kC_{03} + kC_{13} \cdot \beta) M^3 \quad (7)$$

In the above group of calculation expressions, the Mach pressure coefficient Cm, the attack angle pressure coefficient C$\alpha$, the sideslip angle pressure coefficient C$\beta$ are obtained by the calculation processing using the group of primary calculation processing expressions on the basis of the pressure information from the probe. Further, the Mach pressure calibration coefficient kAij, the attack angle pressure calibration coefficient kBij, and the sideslip angle pressure calibration coefficient kCij are obtained in advance by the wind tunnel test and input as a table in the calculation processor. Accordingly, in the above-described group of secondary calculation processing expressions, the unknown quantities are the Mach number M, the attack angle $\alpha$ and sideslip angle $\beta$, and a tertiary polynomial equation comprising three expressions of the group of secondary calculation processing expressions can be subjected to calculation processing to thereby obtain these unknown quantities.

The present invention is based on the above-described principle. The pressure calibration coefficient having the total pressure not depending on the air current angle as a reference in the respective velocity regions is applied whereby the flight velocity vector in the wide velocity region can be calculated quickly without using the static information.

That is, the flight velocity vector is decided in the following procedure. First, using five pressures obtained every updating of pressure information, the attack angle pressure coefficient C$\alpha$ of the air current is obtained by expression (2) from a pressure differential between upper and lower pressure holes, the sideslip angle pressure coefficient C$\beta$ is obtained by expression (3) from a pressure differential between left and right pressure holes, and the air current angle pressure coefficient C$\gamma$ is obtained by expression (4). Further, the Mach pressure coefficient is obtained by expression (1) from the total pressure hole and the pressure differential of a 4-hole average pressure on the square truncated pyramid surface. The magnitude of the Mach number is decided from the pressure calibration coefficient of the known quantity and the air current angle pressure coefficient of the known quantity. Further, the decided Mach number constitutes polynomial approximations (expressions (5) to (7)) to decide the attack angle $\alpha$ and the sideslip angle $\beta$.

Next, an analysis expression for calculating the flight velocity vector from the obtained air current angle, the Mach number and the pressure coefficient is stored in ROM of the calculation processor and successively called for use.

Alternatively, the solution of the tertiary equation for calculation of Mach number carried out halfway is omitted, and a table conversion system for reading Mach number directly can be also employed. In this case, the Mach number table is stored in ROM so that the probe angle is varied in advance with respect to various Mach numbers and air current axis in the wind tunnel, and the Mach number can be decided from a graph showing a relationship between the air current angle pressure coefficient and the Mach pressure coefficient from 5 pressure information. In the pressure calibration coefficients every velocity divided into three, the square truncated pyramid-shape probe is provided in advance on a support device of a low velocity wind tunnel, a transonic velocity wind tunnel and a supersonic wind tunnel, the square truncated pyramid-shape probe is set to the attack angle and the sideslip angle with respect to the air current axis every setting of velocity, five pressure information detected and obtained by the probe every setting, the set attack angle and the sideslip angle are applied to the calculation processing expressions for the primary and secondary calculation processes are decided by the minimum square method and stored in ROM.

(2) Square Truncated Pyramid-Shape Probe

While the square truncated pyramid-shape probe used in the present invention is normally formed as a separate probe, it is to be noted that the probe can be provided directly on a nose portion of an aircraft such as a supersonic plane, as shown in FIG. 3, which example is explained in the present embodiment.

A square truncated pyramid-shape probe 10 according to the present embodiment is similar in fundamental constitution to that previously proposed by the present inventor (Japanese Patent application Laid-Open No. Hei 5-288761), in which an extreme end portion has a multi-hole truncated pyramid-shape, a shield hole 22 is provided at the apex thereof, a total pressure tube 23 of a smaller diameter than that of the shield hole is secured at a position by a predetermined length determined by a relationship with the diameter of the shield hole from the extreme end of the shield hole, and a separate hole 24 (FIG. 4 (b)) for allowing a part of pressure in the shield hole to leak is provided in the vicinity of a bottom end of the shield hole 22. Pressure holes $26_1$ to $26_4$ for detecting pressures $Pb_1$, $Pb_2$, $Pb_3$ and $Pb_4$ acting on truncated pyramid surfaces $25_1$ to $25_4$ are provided in the truncated pyramid surfaces $25_1$ to $25_4$ of the square truncated pyramid-shape probe. In the present embodiment, the pressure holes extend through as single pressure holes $28_1$ to $28_4$ in the inner surface of the probe, but in the square truncated surface of the probe, they are formed as a group of pressure holes comprised of a plurality of holes as shown in FIG. 4 (a). A pressure converter 27 for generating electric signals proportional to pressure is provided on an end of each pressure hole, and pressure detected by the square truncated pyramid-shape probe is converted into an electric signal which is sent to a processor.

Figure 5:
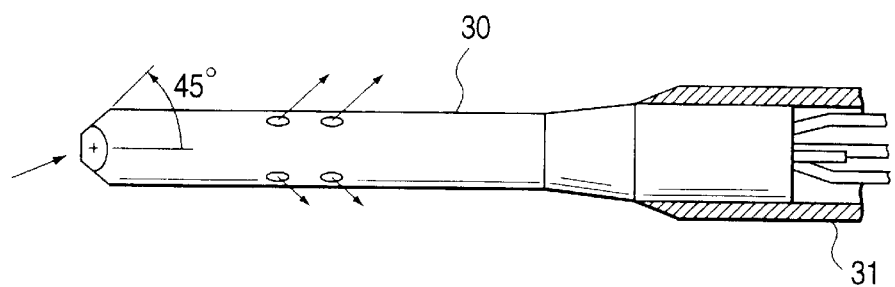
FIG. 5 is a front view of the square truncated pyramid-shape probe according to a further embodiment.
Figure 6:
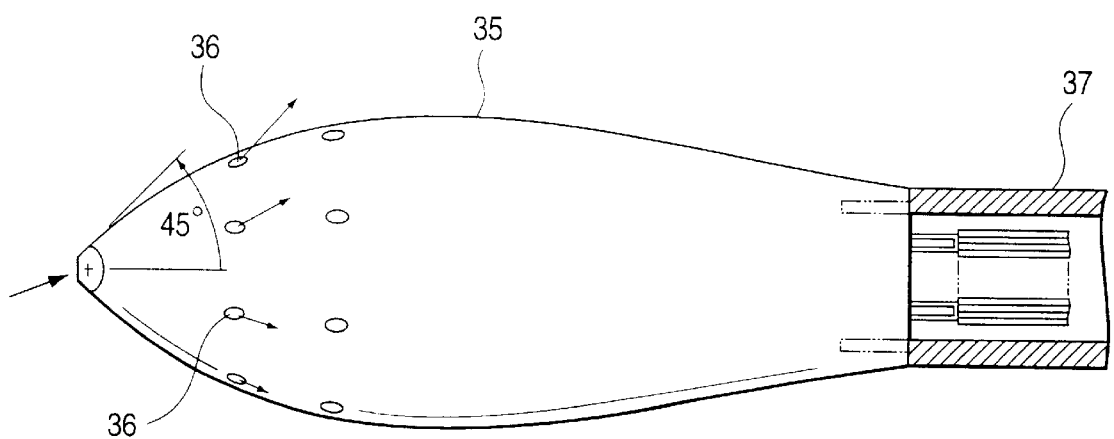
FIG. 6 is a front view of the square truncated pyramid-shape probe according to another embodiment.

FIGS. 5 and 6 show separate embodiments of the square truncated pyramid-shape probe, whose fundamental constitution is similar to that of the previous embodiment, and therefore, the same parts are indicated by the same reference numerals to omit an explanation thereof and only the difference there between will be explained. A square truncated pyramid-shape probe 30 shown in FIG. 5 is formed as a columnar single probe, which is supported on an aircraft y means of a support fitting 31. A square truncated pyramid-shape probe 35 shown in FIG. 6 is formed to be a capsule whose diameter changes in an axial direction as shown, and only a front row of holes of separate holes formed in the peripheral surface thereof are sued as total pressure balance holes 36. In the figure, numeral 7 denotes a support fitting onto an aircraft or the like.

(3) Entire Constitution of a Flight Velocity Vector Calculation Processing System in a Wide Velocity Region The entire constitution of a flight velocity vector calculation processing system according to the present embodiment will be described hereinafter with reference to FIG. 1. This flight velocity vector calculation processing system is fundamentally composed of a square truncated pyramid-shape probe 1, a pressure converter 2, a calculation processor 3, a pressure interface 4, an input interface 5, an output interface 6, and a display device 7 or a related apparatus 8. The calculation processor 3 is connected, as necessary, to external apparatuses such as an atmosphere total temperature information apparatus (TAT) 9, an inertia reference apparatus (IRS), an inertia navigational apparatus (INS) 11 and a whole globe measuring apparatus (GPS) 12 so that temperature information T, three inclinations around axis $\theta$ x, $\theta$ y and $\theta$ z, and flight position information G may be taken in from the TAT 9, the IRS 10, the INS 11 and the GPS 12, respectively.

As mentioned above, the square truncated pyramid-shape probe 1 detects the total pressure Ph during the flight and the measured pressures $Pb_1$ to $Pb_2$ in the square truncated pyramid surface, converts the pressure information into the electric signal through the pressure converter 2 to input it into the calculation processor 3, and multiplies the pressure converter coefficient of the ROM 13 to invert it into the physical quantity. The calculation processor is constructed so that pressure information from the square truncated pyramid-shape probe, temperature information, inertia reference system information and flight position information obtained from the external system are engaged, and the Mach number M, the attack angle $\alpha$, the sideslip angle $\beta$, or a calibration air current velocity Vcas, a true air current velocity Vtas, and an equivalent air current velocity Vias as necessary are obtained by the calculation process and at real time on the basis of the aforesaid information to output them from the output interface 6 to the display device 9 and the related apparatus 8 and output them as display and control information.

The calculation processor 3 includes a central processing unit 14, a ROM 18 for storing therein a pressure calibration coefficient table 15 for a Mach pressure calibration coefficient Aij, an attack angle pressure calibration coefficient Bij and a sideslip angle pressure calibration coefficient Cij in a velocity region (k=1) in which Mach number M is M≦0.2 obtained in advance by the wind tunnel test, a pressure calibration coefficient table 16 in a velocity region (k=2) in which the Mach number is 0.2<M<1.0 and a pressure calibration coefficient table 17 in a velocity region (k=3) in which the Mach number is M≧1.0, and a ROM 19 storing therein a position error table of the probe. The calculation process of three stages is performed within the calculation processor 3 to obtain the flight velocity vector. The decision of the Mach pressure calibration coefficient, the attack angle pressure calibration coefficient and the sideslip angle pressure calibration coefficient of the probe every velocity region is performed in the manner that the square truncated pyramid-shape probe is provided on a support device of a low velocity wind tunnel, a transonic velocity wind tunnel and a supersonic wind tunnel, the square truncated pyramid-shape probe is set to the attack angle and the sideslip angle with respect to the air current axis every setting of velocity, five pressure information detected and obtained by the probe every setting, the set attack angle and the sideslip angle are applied to the calculation processing expressions for the primary and secondary calculation processes are decided by the minimum square method.

First, the total pressure Ph, the Mach pressure coefficient Cm, the attack angle pressure coefficient C$\alpha$ the sideslip angle pressure coefficient C$\beta$ and the air current angle pressure coefficient C$\gamma$ are calculated from only five pressure information of the square truncated pyramid-shape probe using a group of calculation processing expressions A to perform the primary process. Then, the Mach number is computed using the total pressure Ph, the Mach pressure coefficient Cm, the attack angle pressure coefficient C$\alpha$, the sideslip angle pressure coefficient C$\beta$ and the air current angle pressure coefficient C$\gamma$ obtained from the pressure information by the primary process using a group of calculation processing expressions B, and the pressure calibration coefficient of the table stored in the ROM 18 to thereby decide the velocity region whereby the secondary process is performed to calculate the attack angle $\alpha$, the sideslip angle $\beta$ and the air current velocity V with respect to the probe axis.

Next, a tertiary process is performed in the manner that the flight velocity vectors are converted into flight velocity vectors ($M_b$, $\alpha_b$ and $\beta_b$) with respect to the plane axis on the basis of the probe position error date stored in ROM 19 by the information from the inertia reference system 10 and the whole globe measuring system 12. Further, a calibration air current velocity Vcas, a true air current velocity Vtas and an equivalent air current velocity Veas are obtained by the calculation process using a group of tertiary calculation processing expressions, if necessary.

(4) Constitution of a Materialized System of a Flight Velocity Vector Measuring System in a Wide Velocity Region First, a Mach pressure calibration coefficient kAij, an attack angle pressure calibration coefficient kBij and a sideslip angle pressure coefficient kCij are obtained in advance every velocity region by the wind tunnel test, corresponding to the probe having the same shape of the extreme end of the square truncated pyramid-shape, and tabled, which data are stored in ROM and stored in the calculation processing apparatus. FIG. 13 schematically shows tables 15, 16 and 17 of the pressure calibration coefficients.

The calculation processing procedure for flight vectors in a real plane will be explained with reference to a flowchart shown in FIG. 11. The execution of calling the pressure calibration coefficient from the ROM starts before the start of flight (S1 to S2). When the flight starts, five pressure (Ph, Pb1 to Pb4) information detected by the probe is read in CPU (S4). Then, the attack angle pressure coefficient C$\alpha$, the sideslip angle pressure coefficient C$\beta$, the air current angle pressure coefficient C$\gamma$ and the Mach pressure coefficient Cm are computed using the group of calculation processing expressions A from the pressure information (S5).

In S6, the air current angle pressure coefficient C$\gamma$ obtained by the computation and the attack angle pressure calibration coefficient 2Aij in k=2, for example, are read from the pressure calibration coefficient table 16 stored in ROM. In the following secondary calculation processing expression, $$Cm = (_2A_{00} + _2A_{01}M + _2A_{02}M^2 + _2A_{03}M^3) + (_2A_{10} + _2A_{11}M + _2A_{12}M^2 + _2A_{13}M^3)C\gamma^2$$

Mach pressure coefficient Cm' in the case where a boundary value M=0.2 is substituted and Mach pressure coefficient Cm" in the case where M=1.0 is substituted are calculated.

Next, Cm' obtained in S5 is compared with Mach pressure coefficient Cm obtained on the basis of the pressure information of the probe in S5. If Cm≦Cm', a velocity region k=1 is designated in S9. If NO, the procedure proceeds to S8, where Cm' is compared with Cm". If Cm"<Cm≦Cm', a velocity region k=2 is designated in S9. If NO, k=3 is designated. In this manner, the present velocity region is designated in S9, on the basis of which a Mach pressure calibration coefficient kAij corresponding to the velocity region is read from ROM. Further, Mach number is computed by the following tertiary equation of Mach M in which known quantities Cm and Cγ calculated on the basis of the probe information are substituted (S10).

$$Cm=(kA_{00}+kA_{01}M+kA_{02}M^2+kA_{03}M^3)+(kA_{10}+kA_{11}M+kA_{12}M^2 kA_{13}M^3)C\gamma^2$$

The obtained Mach number M is compared with a minimum Mach number kMmini and a maximum Mach number kMmax within the designated region to discriminate whether the obtained Mach number is within the designated velocity region (S11). If it is outside the designated velocity region, the procedure returns to S4, where processes to S11 are again carried out. This process is repeated till the Mach number is within the designated velocity region. If the obtained Mach number is within the designated velocity region, the Mach number is decided as a velocity at that time, and the procedure proceeds to S12.

In S12, the attack angle α with respect to the probe axis is computed on the basis of expressions (2) to (22) from the known attack angle pressure coefficient Cα, the Mach number M and the attack angle pressure calibration coefficient kBij in the velocity region, and the sideslip angle β is computed on the basis of expressions (3) to (32) from the sideslip angle pressure coefficient Cβ, the Mach number M and the sideslip angle pressure calibration coefficient kCij in the velocity region. A velocity vector, a dynamic pressure q and a static pressure (altitude) with respect to the probe axis are computed from the obtained Mach number M, the total pressure Ph, the attack angle α and the sideslip angle β. At that time, air density ρ is obtained from a barometer provided on the aircraft (S13).

Figure 14:
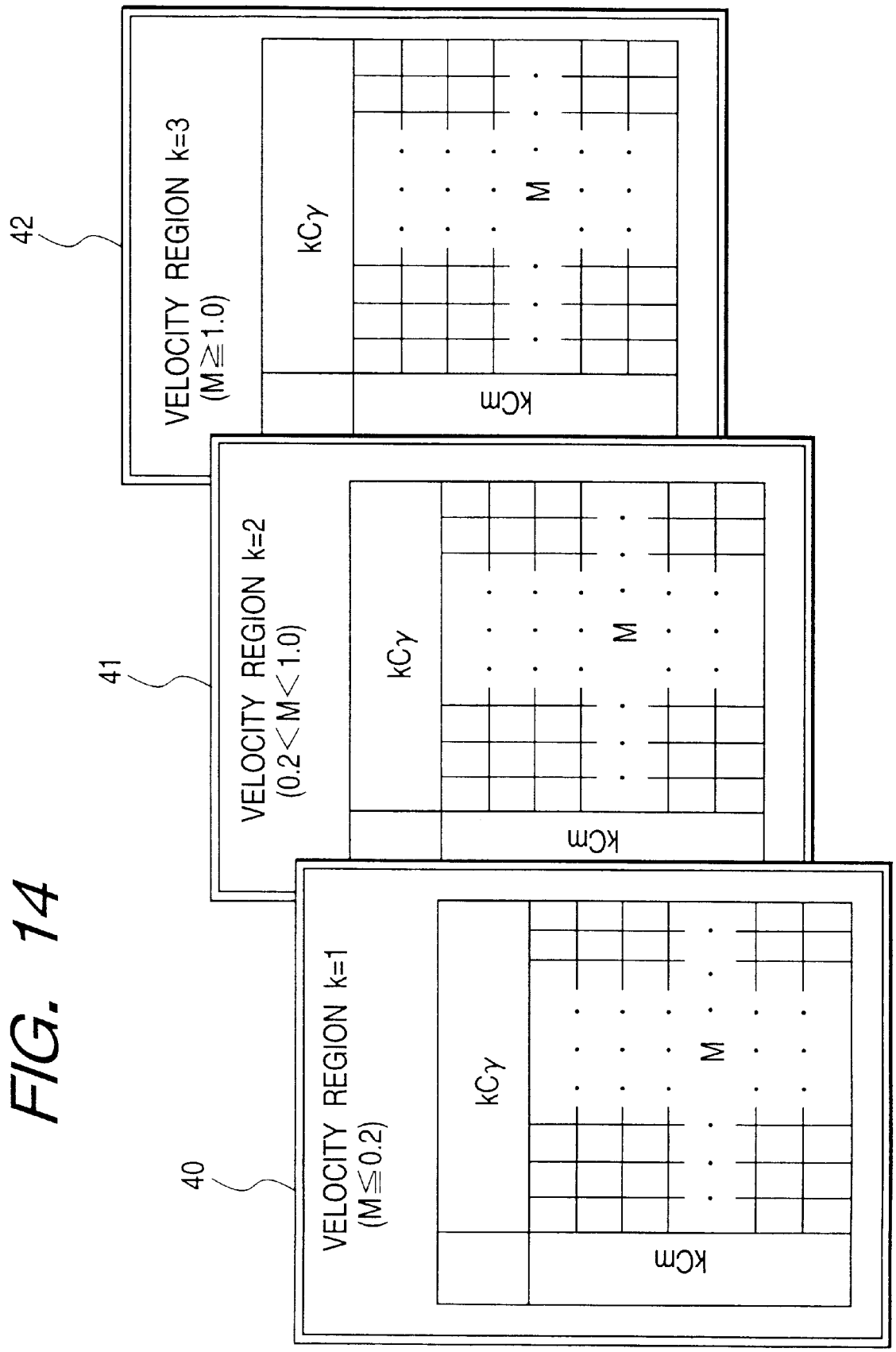
FIG. 14 is a schematic view of a Mach number table in three velocity regions.
Figure 15:
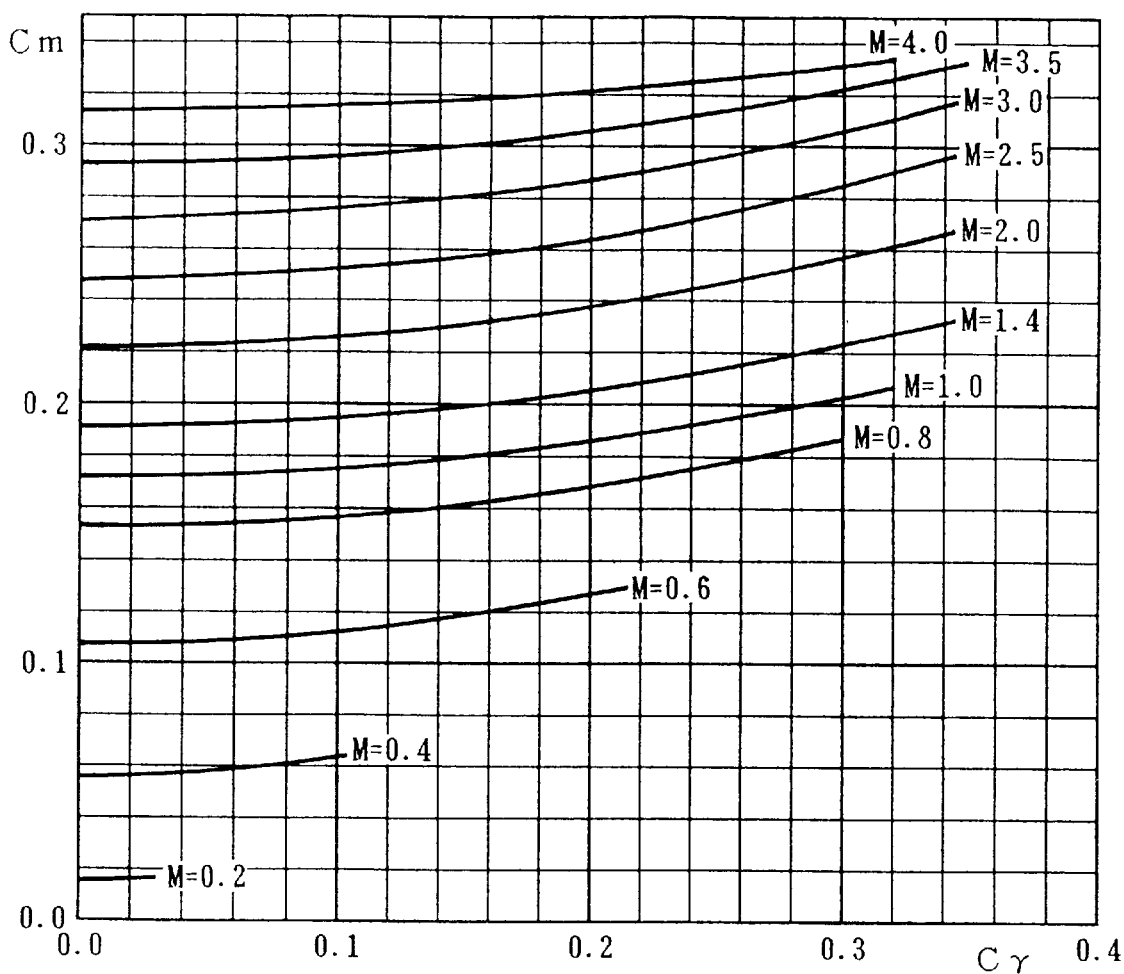
FIG. 15 is a schematic view of a Mach number table for determining Mach number from a Mach pressure coefficient and a air current pressure coefficient in a wide velocity region.

Further, the flight velocity vectors are converted into flight velocity vectors ($M_b$, $α_b$, $β_b$) with respect to the plane axis on the basis of the probe position error data stored in ROM 18 from information from the inertia reference apparatus (IRS), the inertia navigational apparatus (INS) and the whole globe measuring apparatus (GPS) (S14). Further, the calibration air current velocity Vcas, the true air current velocity Vtas and the equivalent air current velocity Vias are obtained by the calculation process using the group of calculation processing expressions C, if necessary. The obtained velocity vector signal is sent to the display device for the flight velocity vectors and displayed thereon (S15). Further, the velocity vector signal is used on the control side of a flight control computer as a air current variation signal, if necessary (S15'). Or, air current variation signals such as a window shear, a drift angle and the like are received in a digital flight apparatus (S15"). The above-described processes S4–S15 are repeated every predetermined time during flight, and air data during flight are updated at real time, The preferred embodiments of the present invention have been illustrated. However, alternatively, the solution of the tertiary equation for calculation of Mach number in S10 and S11 is omitted, and S10' is employed instead whereby Mach number is computed from the air current angle pressure coefficient and the Mach pressure coefficient obtained in advance every velocity region, and Mach number tables are prepared every velocity region and stored in ROM, as shown in FIG. 14, and the velocity region is designated to directly read Mach number from Cγ and Cm. Whereby the calculation process for the velocity vectors can be carried out at high speeds. Furthermore, the Mach number tables are not divided in the velocity regions, but a relationship between the air current angle pressure coefficient Cγ, the Mach pressure coefficient Cm and the Mach number is obtained according to the kind of the square truncated pyramid-shape probe by the wind tunnel test in the wide velocity region as shown in FIG. 15 whereby Mach number tables 40, 41 and 42 in a wide velocity region are prepared and stored in the calculation processor to directly decide the Mach number from the Mach number tables in the wide velocity region.

While in the above-described embodiment, the velocity region is divided into three velocity regions, it is to be noted that the velocity region is not always limited to three divisions but can be divided into four or more, whereby in the velocity regions, the pressure calibration coefficients can be obtained in the manner as described above.

As it will be apparent from the foregoing, according to the flight velocity vector measuring system in the wide velocity region of the present invention, wide velocity regions from low velocity to supersonic velocity are made from the low velocity region and subsonic to three velocity regions, i.e., Mach number 1.0 region, Mach number 1.0 or more so that the pressure calibration coefficient with a total pressure not depending on the air current angle in the velocity regions as a reference is applied whereby the computation of the flight velocity vectors in the wide velocity region can be carried out with high accuracy and at high speeds.

Accordingly, according to the present invention, even in the case where the flight is made at a large attitude angle in the wide velocity region from low velocity to supersonic velocity, the flight velocity vectors can be obtained with high accuracy and at high speeds; and this system is employed in an aircraft, whereby the flight velocity vectors of the aircraft with respect to air current variations, for example, such as a window shear, can be obtained at real time on the plane, which can be used as flight control information for securing the safety of the aircraft.

What is claimed is:

1. A flight velocity vector measuring system in a wide velocity region comprising:
   a primary calculation process in which five pressure information items detected by a truncated pyramid-shape probe, in which an extreme end has a truncated pyramid-shape and a pressure hole is provided in each square truncated pyramid surface, are converted into electric signals and incorporated into a calculation processor, an attack angle pressure coefficient Cα of air current and a sideslip angle pressure coefficient Cβ are obtained from pressure differential information of upper and lower holes of said probe and pressure differential information of left and right pressure holes, respectively, and an air current angle pressure coefficient Cγ is obtained from the attack angle pressure coefficient Cα of air current and the sideslip angle pressure coefficient Cβ thus obtained; and
   a secondary calculation process in which the attack angle pressure coefficient Cα, the angle pressure coefficient Cβ and the air current angle pressure coefficient Cγ, pressure calibration coefficients with respect to a Mach number M, an attack angle α and a sideslip angle β every velocity region obtained by dividing the wide velocity region into a plurality of regions stored in advance in the calculation processor, and a Mach number M, an attack angle α and a sideslip angle β of unknown quantity constitute a calculation processing expression comprising a polynomial approximation to decide the magnitude of the Mach number M, subsequently decide the velocity region by the Mach number M obtained, said pressure calibration coefficients in said velocity region are called, and a flight velocity vector (m, α, β) is calculated by said polynomial approximation, wherein the wide velocity region is divided into three velocity regions consisting of: (1) a velocity region in which the Mach number M is less than 0.2; (2) a velocity region (0.2. M<1.0) from subsonic to a Mach number M of 1.0; and (3) a velocity region in which the Mach number M equals 1.0 or more and an attack angle calibration coefficient table, a sideslip angle pressure calibration coefficient table, and a Mach pressure calibration coefficient table are prepared for every velocity region and stored in a ROM of said calculation processor.

2. The flight velocity vector measuring system in a wide velocity region according to claim 1, wherein said wide velocity region is multi-divided into four velocity regions or more, and an attack angle calibration coefficient table, a sideslip angle pressure calibration coefficient table, and a Mach pressure calibration coefficient table are prepared every velocity region and stored in ROM of said calculation processor.

3. The flight velocity vector measuring system in a wide velocity region according to claim 1 or 2 wherein the calculation processing expressions of said primary and secondary calculation processes are stored in an external ROM, and said external ROM is connected to said calculation processor to successively call them from said external ROM for processing.

4. The flight velocity vector measuring system in a wide velocity region according to claim 1 or 2 wherein a relationship between an air current angle pressure coefficient Cγ, a Mach pressure coefficient Cm and a Mach number is obtained in advance every velocity region according to the kind of truncated pyramid-shape probe by the wind tunnel test to prepare velocity region Mach number tables, which are stored in the calculation processor, and in said secondary calculation process, the Mach number is directly decided from said Mach number tables with the air current angle pressure coefficient Cγ and the Mach pressure coefficient Cm obtained in said primary process.

5. The flight velocity vector measuring system in a wide velocity region according to claim 1 or 2 wherein a relationship between an air current angle pressure coefficient Cγ, a Mach pressure coefficient Cm and a Mach number is obtained in advance in the wide velocity region according to the kind of truncated pyramid-shape probe by the wind tunnel test to prepare wide velocity region Mach number tables, which are stored in the calculation processor, and in said secondary calculation process, the Mach number is directly decided from said Mach number tables with the air current angle pressure coefficient Cγ and the Mach pressure coefficient Cm obtained in said primary process.

6. The flight velocity vector measuring system in a wide velocity region according to claim 1 or 2, including a tertiary process in which an inertia reference device and a whole globe measuring device are engaged with said calculation processor and converting velocity vectors with respect to said probe axis into flight velocity vectors with respect to a plane axis from said inertia reference device and said whole globe measuring device.

7. The flight velocity vector measuring system in a wide velocity region according to claim 1, wherein a decision of a Mach pressure calibration coefficient, an attack angle pressure calibration coefficient and a sideslip angle pressure calibration coefficient of said probe every velocity region is performed in the manner that the square truncated pyramid-shape probe is provided on a support device of a low velocity wind tunnel, a transonic velocity wind tunnel and a supersonic wind tunnel, the square truncated pyramid-shape probe is set to the attack angle and the sideslip angle with respect to the air current axis every setting of velocity, five pressure information detected and obtained by the probe every setting, the set attack angle and the sideslip angle are applied to the calculation processing expressions for the primary and secondary calculation processes are decided by the minimum square method.

\* \* \* \* \*